(12) United States Patent
Bar Nathan et al.

(10) Patent No.: US 8,663,568 B2
(45) Date of Patent: Mar. 4, 2014

(54) APPARATUS AND SYSTEM FOR HANDLING PHOTOCURABLE FLUID WASTE

(75) Inventors: Meir Bar Nathan, Rishon LeZion (IL); David Eshed, Kfar Sava (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 13/544,472

(22) Filed: Jul. 9, 2012

(65) Prior Publication Data

US 2012/0272617 A1 Nov. 1, 2012

Related U.S. Application Data

(62) Division of application No. 12/411,448, filed on Mar. 26, 2009, now Pat. No. 8,232,444.

(51) Int. Cl.
*B09B 3/00* (2006.01)

(52) U.S. Cl.
USPC ........................................ 422/184.1; 588/900

(58) Field of Classification Search
USPC ................................ 422/184.1, 186; 588/900
See application file for complete search history.

(56) References Cited

U.S. PATENT DOCUMENTS 6,902,246 B2   6/2005   Varnon et al.
7,074,029 B2   7/2006   Stockwell et al.

OTHER PUBLICATIONS

Milan Lazár and Jozef Rychlý "Oxidation of hydrocarbon polymers" Polymer Institute, Slovak Academy of Sciences, 842 36 Bratislava, Czechoslovakia, 189-221, 1992.

*Primary Examiner* — Edward Johnson
(74) *Attorney, Agent, or Firm* — Pearl Cohen Zedek Latzer Baratz LLP

(57) ABSTRACT

An apparatus for disposal of photocurable fluid waste may include a conduit for conducting photocurable fluid waste from a source of photocurable fluid waste; a dispenser for automatically dispensing a receptacle made of material that is impermeable to the photocurable fluid waste and that transmits radiation capable of curing; a welder or other sealing device for welding the receptacle to form a bag with a portion of the photocurable fluid waste inside; and a source of radiation for curing the photocurable fluid waste in the bag.

10 Claims, 4 Drawing Sheets

APPARATUS AND SYSTEM FOR HANDLING PHOTOCURABLE FLUID WASTE

CROSS REFERENCE TO RELATED APPLICATION

The present application is a divisional application of patent application Ser. No. 12/411,448, filed on Mar. 26, 2009 now U.S. Pat. No. 8,232,444, entitled "APPARATUS AND METHOD FOR HANDLING PHOTOCURABLE FLUID WASTE", incorporated in its entirety herein by reference.

FIELD OF THE INVENTION

The present invention relates to waste disposal. More particularly, the present invention relates to an apparatus and method for handling photocurable fluid waste.

BACKGROUND

A three-dimensional printing solid freeform fabrication (SFF) system may utilize one or more liquids that the system solidifies so as to fabricate successive layers of a solid product in a desired form. The liquid may be, for example, a photocurable liquid that is polymerized and solidified through exposure to radiation, such as ultraviolet (UV) radiation. Such a system may produce fluid waste as a byproduct of the fabrication process. It may not be desirable to store the waste in its liquid form, and laws or regulations may prohibit this. It may not be desirable to dispose of such waste by using such standard methods as a sewerage system or a municipal waste removal service, and laws or regulations may prohibit this as well. It may be easier to dispose of or handle the waste when solidified.

Systems for removing and accumulating waste material from an SFF system have been described previously. A system in which waste material from an SFF system is stored in an accumulator tank has been described previously. In the described system, when the accumulator tank is filled, the contents of the accumulator tank are emptied into removable receptacle, such as a disposable polypropylene bag. When the removable receptacle is filled with fluid waste, a user may remove the removable receptacle and replace it with another. The accumulator tank serves as a buffer between the SFF system and the removable receptacle, so that the removable receptacle may be removed while the SFF system is in use.

Other systems have been described to overcome a problem of fluid waste that may become too viscous to flow, or that may even solidify, when allowed to cool to room temperature. With such fluid waste, an accumulator tank, as well as all tubing that brings waste to the accumulator tank, may need to be heated. When the removable receptacle is not heated, fluid waste emptied into it may solidify prematurely and unevenly, rendering the receptacle difficult to fill. Therefore, a variation of the above waste disposal system has also been described. The variation attempts to overcome the problem of uneven solidification in the removable receptacle by allowing heated fluid waste from the SFF system to flow directly into the removable receptacle. A source of radiant heat heats the fluid waste that has accumulated in the removable receptacle. The radiant heat maintains the upper layer of the accumulated fluid waste in a liquid state. Prior to removing and replacing the removable receptacle, the waste in the receptacle is allowed to cool and to solidify or gel. However, the receptacle cannot be removed or replaced while the system is operating.

In the above systems the waste accumulates for the most part in liquid form until it is removed by, or is about to be removed by, a human operator. Therefore, there exists the possibility of spillage or leakage of the fluid waste during handling.

SUMMARY OF THE INVENTION

There is thus provided, in accordance with some embodiments of the present invention, an apparatus for disposal of photocurable waste. The apparatus includes a conduit for conducting photocurable fluid waste from a source of photocurable fluid waste. The apparatus further includes a dispenser for automatically dispensing a receptacle made of material that is impermeable to the photocurable fluid waste and that transmits radiation capable of curing. The apparatus further includes a sealer for sealing the receptacle to form a bag with a portion of the photocurable fluid waste inside, and a source of radiation for curing the photocurable fluid waste in the bag.

Furthermore, in accordance with some embodiments of the present invention, the receptacle includes two substantially parallel sheets and the dispenser includes two reels (for example opposite reels) around each of which one of the sheets is initially wound.

Furthermore, in accordance with some embodiments of the present invention, the source of radiation includes a UV radiation source.

Furthermore, in accordance with some embodiments of the present invention, the source of photocurable fluid waste includes a solid freeform fabrication system.

Furthermore, in accordance with some embodiments of the present invention, the apparatus includes a control unit.

Furthermore, in accordance with some embodiments of the present invention, the apparatus includes a sensor for sensing the quantity of the photocurable fluid waste in the bag.

There is further provided, in accordance with some embodiments of the present invention, a method for disposal of photocurable waste. The method may include conducting photocurable waste from a source of photocurable waste through a conduit; automatically dispensing, using a dispenser, a receptacle made of material that is impermeable to the photocurable fluid waste and that transmits radiation capable of curing; sealing the receptacle to form a bag with a portion of the photocurable fluid waste inside; and curing the photocurable fluid waste in the bag using a source of radiation.

Furthermore, in accordance with some embodiments of the present invention, the method includes disposing the bag.

Furthermore, in accordance with some embodiments of the present invention, the method includes sensing the quantity of the photocurable fluid waste in the bag prior to sealing the bag.

Furthermore, in accordance with some embodiments of the present invention, the method includes detaching the bag from the material prior to the step of disposing the bag.

Furthermore, in accordance with some embodiments of the present invention, the receptacle includes two substantially parallel sheets, and the dispenser includes two opposite reels around each of which one of the sheets is initially wound.

Furthermore, in accordance with some embodiments of the present invention, the source of radiation comprises a UV radiation source.

Furthermore, in accordance with some embodiments of the present invention, the source of photocurable fluid waste includes a solid freeform fabrication system.

There is further provided, in accordance with some embodiments of the present invention, a solid freeform fabrication system including a source of photocurable fluid waste and an apparatus for disposal of the photocurable fluid waste. The apparatus includes a conduit for conducting the photocurable fluid waste from the source; a dispenser for automatically dispensing a receptacle made of material that is impermeable to the photocurable fluid waste and that transmits radiation capable of curing; a sealer for sealing the receptacle to form a bag with a portion of the photocurable fluid waste inside; and a source of radiation for curing the photocurable fluid waste in the bag.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF EMBODIMENTS

Figure 1A:
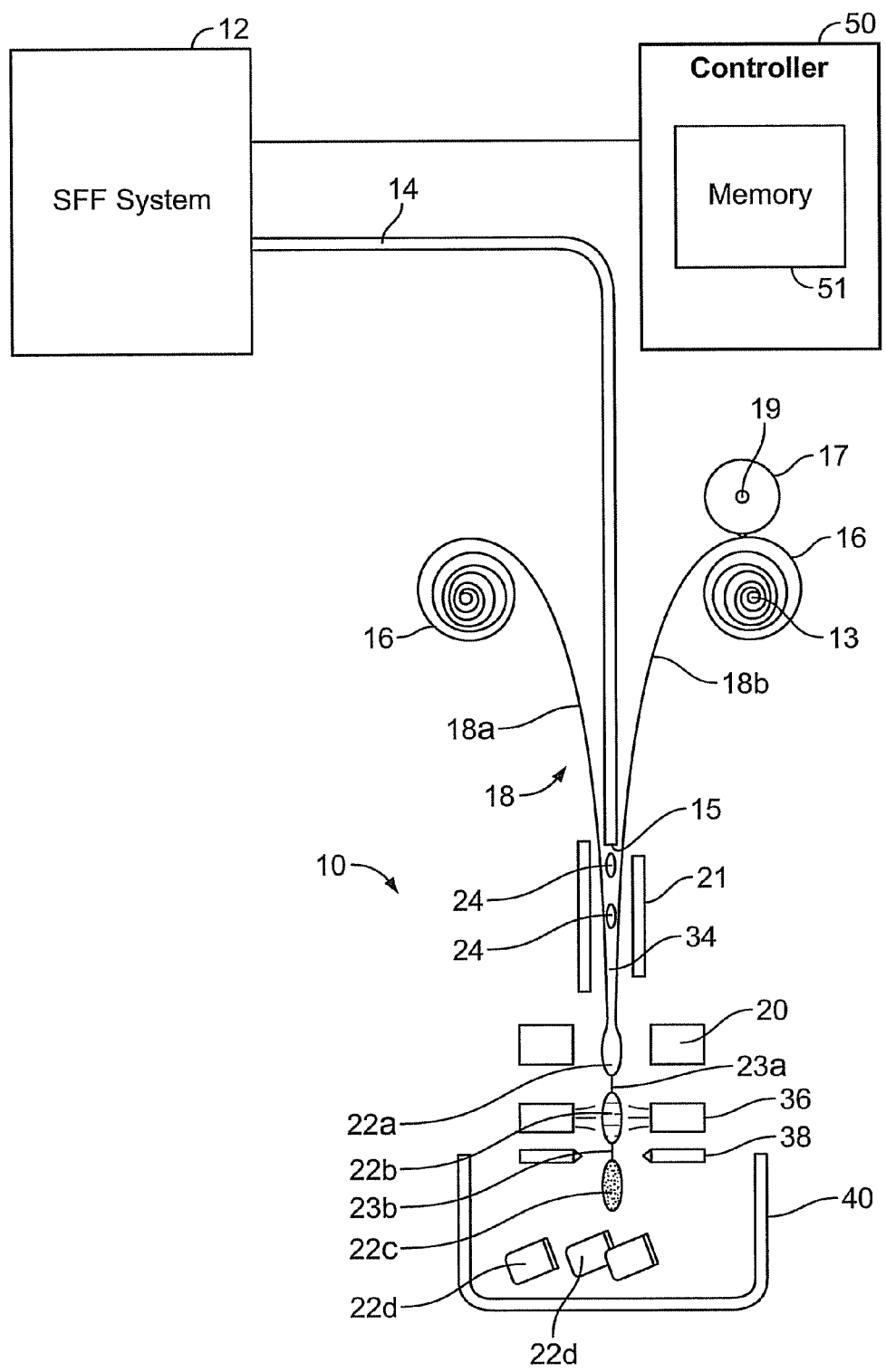
FIG. 1A is a schematic diagram of a photocurable fluid waste disposal system, in accordance with embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

A waste disposal system for photocurable fluid waste, in accordance with embodiments of the present invention, solidifies photocurable fluid waste. In this description, a photocurable fluid may refer to a photocurable liquid or gel. Photocurable fluid waste may be produced by a source of photocurable fluid waste as a byproduct of the operation of a solid freeform fabrication (SFF) system, such as a three-dimensional printing system, or of other devices or systems that utilize similar materials. Photocurable fluids include, for example, acrylic photopolymers, but other materials may be used. A photocurable fluid, liquid or gel, may polymerize and solidify as a result of exposure to electromagnetic radiation in one or more wavelength bands, such as UV, visible light, or infrared (IR) radiation. Other hardening or curing methods may be used.

A fluid waste disposal system in accordance with embodiments of the present invention automatically provides or dispenses a receptacle in which photocurable fluid waste may be collected. In some embodiments of the present invention, a receptacle is provided by automatically fabricating a bag. Alternately, already formed bags or receptacles may be dispensed. The fluid waste disposal system may include a device for formation of a bag out of one or more strips, sheets, or films of a flexible material. The strips may be provided in a continuous manner, but need not be. For example, a strip of the material sufficiently long for the production of several or numerous bags may be initially wound around one or more spools or reels, or otherwise contained in an automatic dispenser. For example, opposite reels or spools around which material is wound may be located on opposite sides of a conduit conducting fluid waste. Rotation of the spool or activation of the automatic dispenser dispenses a length of strip sufficient for the formation of a new bag. The spool may be provided with a mechanical sensor, such as a measuring wheel, or other appropriate sensor that is configured to detect when a sufficient length of material has been dispensed. The material of which the bag is formed is impermeable to the fluid waste or to any products of the photocuring process. On the other hand, the material of which the bag or the walls of the bag is formed transmits, e.g. may be transparent or translucent to, electromagnetic radiation in a wavelength band that drives the photocuring process. A suitable bag material may include, for example, polypropylene or nylon, but other materials may be used. The system may include a device that seals, welds, glues, tapes, or otherwise causes a section of the strip or strips to adhere or connect, so as to fashion a bag with a sealed bottom and sides, but open at the top. The sealed bottom and sides of the bag may be impermeable to the fluid waste. Liquid or gel waste may be conducted from the SFF system through a tube or other conduit. The nozzle through which fluid waste exits the tube is placed such that the fluid waste drips or pours into the open top of the bag. A sensor, such as an optical, mechanical, acoustic, or flow sensor, may be configured to detect when the bag has filled to a predetermined level. When the bag is filled, the top of the bag is sealed shut. An area at the top of the bag may be sealed using the method that was used to seal the bottom and sides of the bag, or by using another method.

The sealed area at top of the bag may be wide enough to form both the sealed top of the filled bag, and the sealed bottom of a new empty bag. The sides of the new empty bag may be sealed or created simultaneously. In this manner, an empty bag may be formed above the filled bag, while the filled bag is being conveyed downward or away from the fluid waste nozzle. In this manner, an empty bag may be always situated below the nozzle and is in position to collect the fluid waste that exits from the nozzle.

The sealed bag is then exposed to a source that produces continuous or intermittent electromagnetic radiation in the wavelength band that causes the liquid or gel waste to cure. Exposure to the radiation may cure the waste in the bag, solidifying the waste. Other curing or solidifying methods may be used. Once the waste is cured and solidified, the bag of cured waste may be severed by a blade, knife, wire, laser, or other severing mechanism. The severed bag may fall into or may otherwise be conveyed to a collection container, holder or receptacle. Alternatively, a bag of cured waste may remain attached to the strip. In this manner, a string or strip of sealed bags of cured waste is formed, which may be conveyed to a collection receptacle. The string of sealed bags of cured waste may be severed later at any point between two bags of cured waste, without risk of releasing fluid waste.

A sensor, such as an optical, acoustic, mechanical, electromagnetic or other suitable sensor, such as a weighing device, may be configured to detect when the collection receptacle is filled to a predetermined level. When the collection receptacle is filled, an operator may remove the filled bags of cured waste without disrupting the operation of the SFF system or the fluid waste disposal system.

Figure 1B:
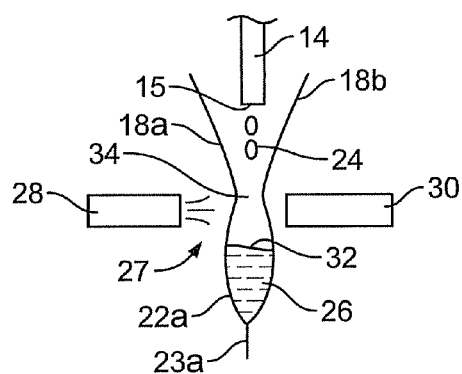
FIG. 1B is an enlargement of the fluid waste collection portion of the photocurable fluid waste disposal system shown in FIG. 1A.

FIG. 1A is a schematic diagram of a photocurable fluid waste disposal system, in accordance with embodiments of the present invention. FIG. 1B is an enlargement of the fluid waste collection portion of the photocurable fluid waste disposal system shown in FIG. 1B. A source of photocurable fluid waste, such as a three-dimensional printing system or SFF system 12, produces photocurable or otherwise solidifiable or curable fluid, e.g. liquid or gel, waste that is to be handled by waste disposal system 10. Fluid waste 24 is conducted from SFF system 12 to waste disposal system 10 by a conduit or tube 14. The rate of flow from SFF system 12 may be variable or the flow may be intermittent. Ideally, the disposal system accepts flow at the maximum rate SFF system 12 produces it. Material from which waste collection bags are to be formed, such as a transparent sheet or film, is initially contained in dispensers (the material need not be transparent). For example, material strip(s) 18 may be initially wound about one or more dispensers. For example, two reels or spools 16 for dispensing material strip 18 may be located on opposite sides of tube 14. At appropriate points during the waste disposal process, dispensers, such as spools 16, rotate to dispense a predetermined length of material strip 18. For example, a measuring wheel 17 may be rotated by motion of material strip 18 as it is being dispensed. Rotary encoder 19 senses the rotation and measures the length of material strip 18 that is dispensed. Alternatively, a spring loaded lever and sensor (similar to arm 46 and micro-switch 48 in FIG. 3) may measure the change of diameter of spool 16 as a result of dispensing material strip 18. Alternatively, a rotary encoder connected to axle 13 of spool 16 may sense rotation of spool 16 as a result of dispensing a measured length of material strip 18. The dispensed portion of material strip 18 hangs below nozzle 15 of tube 14 as two parallel strips or sheets, strip or sheet 18a and strip or sheet 18b. Welding, sealing or adhering (e.g., gluing) device 21 may cause portions of strips 18a and 18b to adhere, seal or otherwise connect to one another, forming the sides of bag 22a with sealed or adhered sides. Welding device 20 may cause portions of strips 18a and 18b to adhere or seal to one another, forming a sealed or adhered bottom of bag 22a, but with opening 34 remaining open at the top of the bag. Fluid waste 24 is allowed to drip or pour into bag 22a, accumulating as collected fluid waste 26.

One or more sensors, such as optical sensor 27, may detect the position of top surface 32 of collected fluid waste 26. Alternatively, optical sensor 27 may detect when bag 22a fills to a predetermined level. For example, optical sensor 27 may include optical source 28 and optical detector 30. Optical source 28 may emit a beam of electromagnetic radiation in the direction of optical detector 30. When top surface 32 fills to the predetermined level, collected fluid waste 26 interrupts the beam, causing optical detector 30 to generate a signal that indicates that bag 22a is filled. In response to the signal, spools 16 rotate to dispense a measured amount of material strip 18. Strips 18a and 18b lengthen, lowering opening 34 to the position of bag 22b. Alternatively, a sensor may detect when opening 34 is lowered to the level of bag 22b. With opening 34 at the level of welding or sealing device 20, welding device 20 causes sections of strips 18a and 18b to adhere or connect. Causing sections of strips 18a and 18b to adhere seals the top opening of filled bag 22b, forming a sealed bottom of a new bag 22a positioned above filled bag 22b. Sealed section 23a that forms both the sealed bottom of bag 22a and the sealed top of filled bag 22b may be of sufficient size to enable severing of sealed section 23a while leaving intact and sealed both the bottom of bag 22a and the top of filled bag 22b. Other sensors may be used.

One or more radiation source(s) 36 may be configured to irradiate the contents of filled bag 22b with electromagnetic radiation. Bag 22a may be irradiated all at once, after being filled, or alternately irradiated as it is being filled. Suitable radiation sources include for example UV, visible light, and IR radiation sources. The electromagnetic radiation may be of such intensity, and of such a wavelength, as to be capable of curing and solidifying the fluid contents of filled bag 22b. Radiation sources 36 continue to irradiate the contents of filled bag 22b until the contents of filled bag 22b are solidified. The radiation may be of sufficient intensity so as to ensure that the contents of filled bag 22b are cured before bag 22a is filled with fluid waste when the flow rate of the fluid waste is maximal. Alternatively, the rate of flow of the fluid waste may be determined by a flow sensor, and the intensity of the radiation adjusted accordingly.

Once the contents of filled bag 22b are solidified, filled bag 22b may be detached from bag 22a. After bag 22a is filled, spools 16 rotate to further dispense a measured length of material strip 18. Other methods of dispensing, different from rotating on a spool, may be used. Dispensing a length of material strip 18 may move or lower filled bag 22b to the position of solidified bag 22c. Sealed section 23b connecting the top of solidified bag 22c to the bottom of filled bag 22b, may be positioned at the level of cutting or severing device 38. Cutting device 38 severs sealed section 23b. Detached solidified bag 22c then may fall into bag container, holder or receptacle 40. The bag 22c may be removed by a method other than letting it fall. For example, a bag may be carried away by an automatic arm or conveyor. Bag container or receptacle 40 may be large enough to accommodate several detached bags 22d. Alternatively, the cutting device may be located below the height of cutting device 38 as it is shown in the figures. For example, it may be that a determination of the location of sealed section 23b with respect to cutting device 38 is not sufficiently precise to ensure that no fluid waste leaks out as a result of the severing operation. In that case, it may be preferable to locate the cutting device such as to sever a sealed section that connects two solidified bags.

Figure 2A:
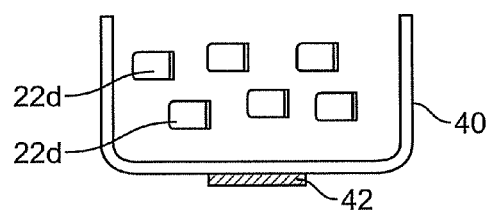
FIG. 2A is a schematic diagram of a solidified waste bag receptacle provided with a weight sensor, in accordance with embodiments of the present invention.

A detached bag 22d may be removed from bag receptacle 40 without disrupting operation of either SFF system 12 or waste disposal system 10. Bag container or receptacle 40 may be provided with one or more sensors configured to generate a signal or cause an action when bag receptacle 40 needs to be emptied. For example, if the weight of a detached bag 22d is known, bag receptacle 40 may be provided with a weight sensor. FIG. 2A is a schematic diagram of a solidified waste bag receptacle provided with a weight sensor, in accordance with embodiments of the present invention. When weight sensor 42 detects that the weight of bag receptacle 40 and detached bags 22d has reached or exceeded a predetermined threshold weight value, weight sensor 42 generates a signal. The threshold value may be selected to be close to the weight of bag receptacle 40 when filled to its capacity with detached bags 22d. Also, generation of a signal may be contingent on the weight detected by weight sensor 42 exceeding the threshold value for a minimum period of time (e.g., to eliminate transient effects of the impact of a detached bag falling into the bag receptacle or container).

Figure 2B:
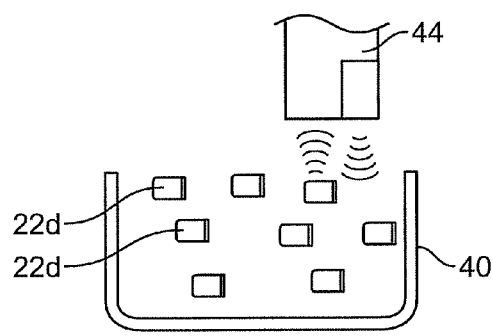
FIG. 2B is a schematic diagram of a solidified waste bag receptacle provided with a height sensor, in accordance with embodiments of the present invention.

Alternatively, the bag receptacle may be provided with a sensor that detects when the height of the accumulated detached bags reaches or exceeds a predetermined threshold height value. FIG. 2B is a schematic diagram of a solidified waste bag receptacle provided with a height sensor, in accordance with embodiments of the present invention. The height sensor may be in the form of an optical, acoustic, electromagnetic, or mechanical sensor, for example; other sensor may be used. For example, the height sensor may be an ultrasonic range sensor 44. When ultrasonic range sensor 44 detects that the height of detached bags 22d accumulated in bag receptacle 40 has exceeded the threshold value for a minimum period of time (to eliminate transient effects of a detached bag while it is falling or settling into position), ultrasonic range sensor 44 generates a signal. Such a signal may alert a human operator to empty or remove the container or receptacle 40, or may cause a machine to empty or remove the container or receptacle 40. Other actions, such as stopping the operation of three-dimensional printing system or SFF system 12, may take place in response to the signal.

Figure 3:
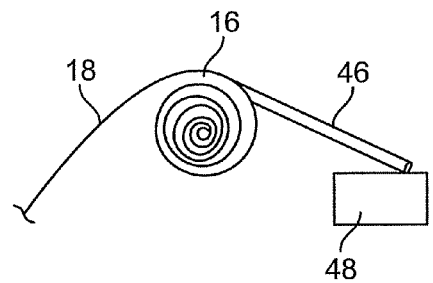
FIG. 3 is a schematic diagram of an automatic dispenser spool provided with a diameter sensor.

One or both spools or dispensers for dispensing the material of which the bags are fashioned may be provided with one or more sensors that may be configured to indicate when the quantity of material remaining is the dispenser has fallen below a predetermined minimum. For example, in the case when the material is in the form of a strip wound around the spool, the diameter of the strip on the spool may indicate the quantity of material strip remaining on the spool. FIG. 3 is a schematic diagram of a automatic dispenser spool provided with a diameter sensor, in accordance with embodiments of the present invention. Arm 46 is kept held against loaded spool 16 by gravity, a spring, or any other appropriate mechanism. Material strip 18 is wound about spool 16 and is dispensed as needed by the waste disposal system. As material strip 18 is dispensed, the diameter of the material wound about spool 16 decreases. As the diameter of the material wound about spool 16 decreases, arm 46 is lowered or otherwise moves. When arm 46 is moved past a predetermined point, a micro-switch 48 or other device is activated. In general, the point at which micro-switch 48 is activated is configured to correspond to a situation where spool 16 is almost empty and should be replaced with a loaded spool.

In order to prevent liquid or gel waste from spilling while spool 16 is being replaced, the SFF system may suspend its operation, and thus the production of fluid waste, during the replacement procedure. Alternatively, the SFF system may block the flow of fluid waste to the waste disposal system during the replacement procedure, or divert the flow to a temporary container. Alternatively, the SFF system may detect the amount of material remaining on spool 16, and calculate or estimate the amount of waste that may be produced by a given SFF job, before starting the job. In the event that the remaining amount of material on the spool is not sufficient to accommodate the anticipated quantity of fluid waste, the SFF system may warn an operator to replace the spool before starting the job.

Figure 4:
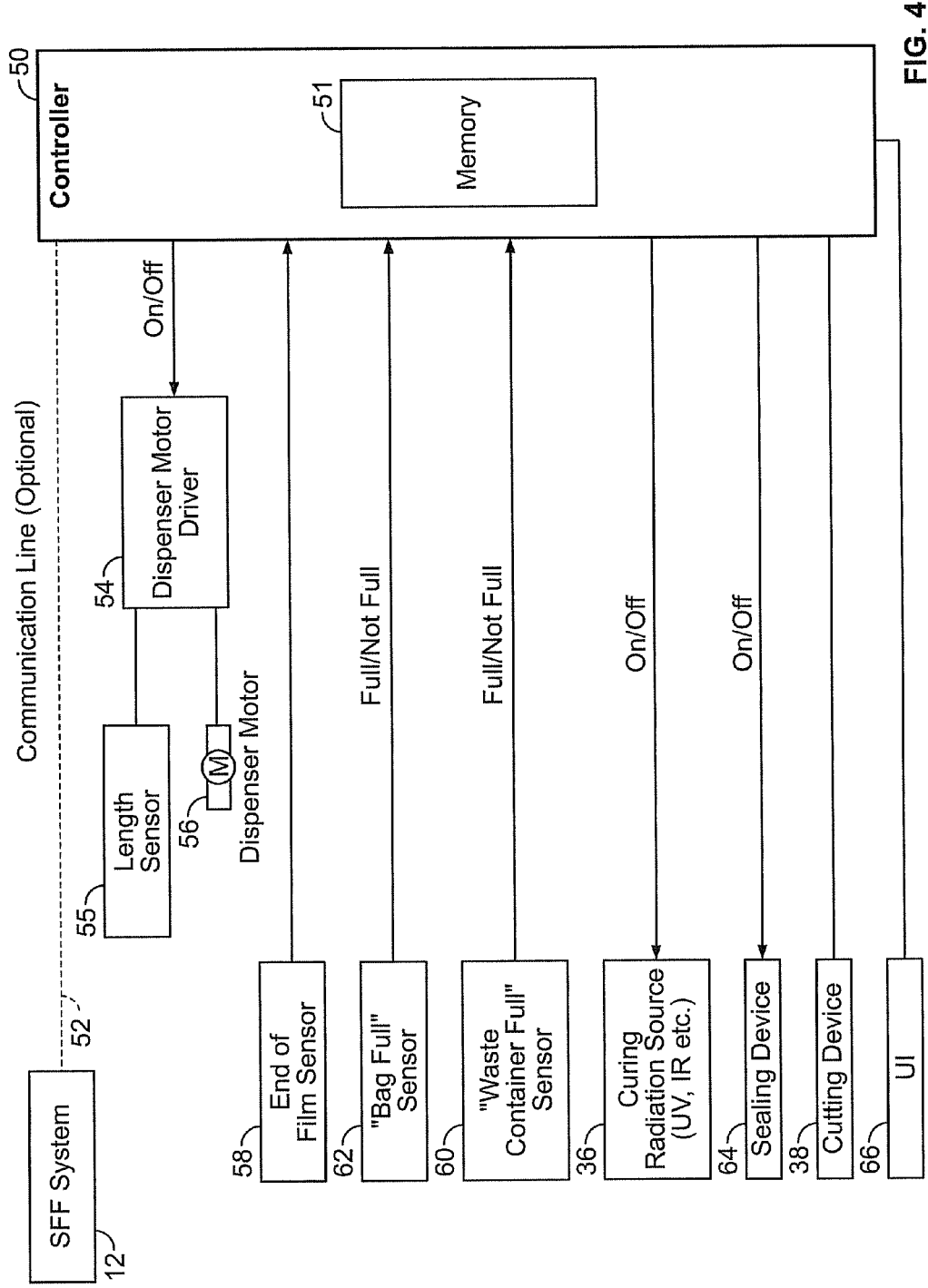
FIG. 4 is a block diagram of a method for control of a waste disposal system, in accordance with embodiments of the present invention.

FIG. 4 is a block diagram of a method for control of a waste disposal system, in accordance with embodiments of the present invention. Operation of the various components of the fluid waste disposal system may be controlled by a control unit, such as controller 50. Controller 50 may be or include a processor operating in accordance with stored, programmed instructions, a dedicated electronic circuitry, or a combination of the above. Controller 50 communicates with various components of the waste disposal system, and possibly one or more external devices or systems. Controller 50 may accept user commands or other data and may communicate output data to a user, e.g. via a user interface, and may communicate with or include one or more timing devices or clocks for timing the various processes carried out by the waste disposal system. Controller 50 may include a memory 51 for storing, for example, instructions, computer code, model designs, and/or settings. Memory 51 may store for example data or settings related to the full status of receptacles or bags, or the status of the amount of material placed in a receptacle, or the amount of bag material left.

For example, controller 50 may receive a signal from full bag sensor 62 (such as optical sensor 27 in FIG. 1B) that a bag has filled with fluid waste. At this point, it may be necessary to convey the filled receptacle or bag to where it may be sealed, and to form or dispense a new bag to be filled. While in some embodiments, a dispenser forms a bag, e.g., from sheets of plastic, in other embodiments, fully or partially formed bags or receptacles may be stored and dispensed. Controller 50 may send an instruction or signal to dispenser driver 54 to dispense an appropriate length of bag material. Dispenser driver 54 may communicate with dispenser motor 56 and dispensed length sensor 55. Operation of dispenser motor 56 may cause a dispenser to dispense bag material, for example by rotating one or more spools or reels around which receptacle or bag material is initially wound. Dispensed length sensor 55 may measure the length of dispensed material directly, for example by using a measuring wheel or roller, or may measure the length indirectly, for example by measuring the amount of time that dispenser motor 56 has operated at given rate. Dispenser driver 54 may cause dispenser motor 56 to operate until dispensed length sensor 55 indicates that the appropriate length of material has been dispensed. At this point, dispenser driver 54 may communicate an indication to controller 50, indicating that the appropriate length of bag material has been dispensed. Alternatively, one or more sensors (not shown) may indicate when the filled bag has been conveyed to the appropriate location for sealing.

During or after the dispensing of bag material, material sensor 58 (such as the sensor shown in FIG. 3) may indicate that the quantity of bag material remaining in the dispenser has decreased below a minimum value. Controller 50 may then operate user interface 66 to indicate to a system operator that the dispenser must be refilled or replaced. User interface 66 may include a display and may generate one or more visible or audible signals that indicate that the dispenser requires attention. Controller 50 may concurrently send a signal indicating the situation to SFF system 12 over communications link 52. In response, SFF system 12 may suspend operation or perform any other appropriate action to avoid spilling fluid waste. When material sensor 58 indicates that the dispenser is loaded, a signal is sent to controller 50 to allow operation of the waste disposal system to resume.

After the appropriate length of bag material has been dispensed, the filled bag may be conveyed to where sealing device 64 (such as welding device 20 in FIG. 1A) seals or closes the top of the filled bag. Controller 50 then may communicate one or more instructions to sealing device 64. In response to the communicated instructions, sealing device 64 may seal the top of the filled bag while concurrently forming a new empty bag.

After the filled bag is sealed or closed, controller 50 may communicate instructions to curing radiation source 36 to operate, or may otherwise cause a device to cure or harden stored waste liquid or gel. Optionally, controller 50 may require an indication from a sensor (not shown) that the sealed filled bag is correctly positioned with respect to radiation source 36, prior to operating radiation source 36. Operation of radiation source 36 causes irradiation of a filled bag. Irradiation of the filled bag causes the fluid waste contents of the sealed filled bag to solidify. While the filled bag is being irradiated, fluid waste may be filling the new empty bag that was formed. The capacity of the bags and the rate of irradiation are such that in general, the contents of the sealed filled bag solidify before the new empty bag has filled with fluid waste. Thus, when the new empty bag has filled with fluid waste, as indicated by full bag sensor 62, controller 50 instruct dispenser driver 54 to dispense an additional length of bag material. Alternatively, controller 50 may monitor the time required to fill the new bag fluid waste. In the event that the new bag fills with fluid waste before the contents of the sealed filled bag have solidified, controller 50 may send instructions to SFF system 12 to suspend or slow operation, and may alert an operator using user interface 66.

After the contents of the sealed filled bag have been solidified and the new bag has been filled, dispenser driver 54 may cause an additional length of bag material to be dispensed. The section of sealed bag material between the top of solidified sealed filled bag and the bottom of the newly filled bag is positioned to be severed by cutting device 38. Optionally, a sensor (not shown) may indicate when the section of sealed bag material is properly positioned to be severed. Controller 50 may cause cutting device 38 to sever the section of sealed bag material, detaching the solidified sealed bag. The solidified sealed bag may fall into, or may be conveyed to, a bag container or receptacle. Full receptacle sensor 60 (such as weight sensor 42 in FIG. 2A, or ultrasonic range sensor 44 in FIG. 2B) may indicate that the quantity of bags in the bag receptacle exceeds a predetermined value. In this case, controller 50 may alert the operator using user interface 66. In the case that the alert is ignored, or that the quantity of bags in the bag receptacle is such as to impede operation of the waste disposal system, controller 50 may communicate instructions to SFF system 12, causing SFF system 12 to suspend or slow operation.

Figure 5:
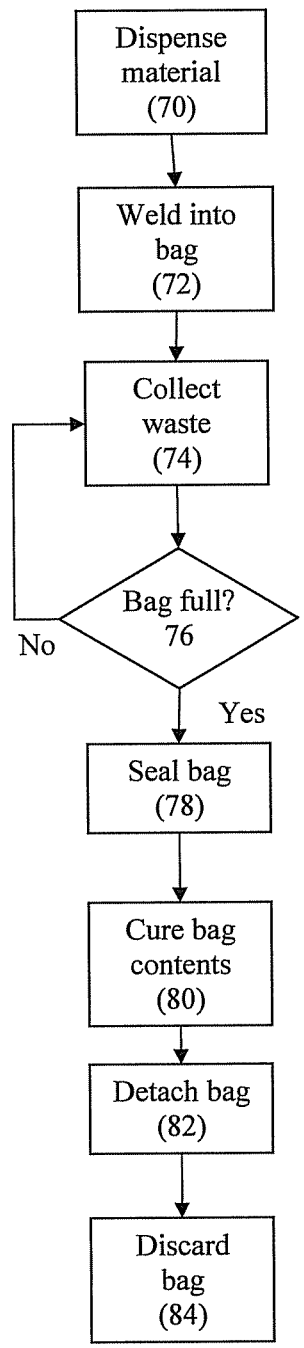
FIG. 5 is a flow chart of a method for disposal of photocurable fluid waste, in accordance with embodiments of the present invention.

FIG. 5 is a flow chart of a method for disposal of photocurable fluid waste, in accordance with embodiments of the present invention. A dispenser may dispense a quantity of sheets, strips or other portions of bag or receptacle material sufficient for the formation of a receptacle or bag (step 70). A sealer, welder, gluer, or other bag formation device, forms the material into a receptacle or bag capable of collecting liquid or gel waste (step 72). Liquid or gel waste is allowed to flow into the bag (step 74). A sensor monitors the amount of fluid waste in the bag, and detects whether a predetermined quantity of fluid waste has been collected in the bag (step 76). If the predetermined quantity of fluid waste has not yet been collected, fluid waste is allowed to continue to flow into the bag (returning to step 74). When the bag has been filled with the predetermined quantity, the bag formation device forms the bag by for example sealing or closing the bag (step 78), possibly simultaneously forming a new bag in position to collect fluid waste. The contents of the bag may be solidified; for example the sealed bag may be irradiated with curing radiation until the contents of the bag are cured and solidified (step 80). The bag of cured waste may be detached from the strips of bag material (step 82). The detached bag may for example fall or be moved into a container or receptacle, from which the bag is later discarded or otherwise disposed of (step 84).

Embodiments of the present invention provide an apparatus and method for automatically collecting, packaging, and solidifying fluid (e.g. liquid or gel) waste which may be photocurable.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

What is claimed is:

1. An apparatus for disposal of photocurable waste comprising:
    a conduit for conducting photocurable fluid waste from a source of photocurable fluid waste;
    a dispenser for automatically dispensing a receptacle made of material that is impermeable to the photocurable fluid waste, the material transmitting radiation capable of curing;
    a sealer for sealing the receptacle to form a bag with a portion of the photocurable fluid waste inside; and
    a source of radiation for curing the photocurable fluid waste in the bag.

2. The apparatus of claim 1, wherein the receptacle comprises two substantially parallel sheets, and wherein the dispenser includes two opposite reels around each of which one of the sheets is initially wound.

3. The apparatus of claim 1, wherein the source of radiation comprises an ultraviolet radiation source.

4. The apparatus of claim 1, wherein the source of photocurable fluid waste comprises a solid freeform fabrication system.

5. The apparatus of claim 1, comprising a control unit.

6. The apparatus of claim 5, comprising a sensor for sensing the quantity of the photocurable fluid waste in the bag.

7. A solid freeform fabrication system comprising a source of photocurable fluid waste and an apparatus for disposal of the photocurable fluid waste, the apparatus comprising:
    a conduit for conducting the photocurable fluid waste from the source;
    a dispenser for dispensing a receptacle made of material that is impermeable to the photocurable fluid waste, the receptacle comprising walls that transmit electromagnetic radiation capable of curing;
    a sealer to form a bag from the receptacle; and
    a source of radiation for curing photocurable fluid waste in the bag.

8. The system of claim 7, comprising a sensor to sense the quantity of photocurable fluid waste in the bag.

9. The system of claim 7, wherein the receptacle comprises two substantially parallel sheets, and wherein the dispenser includes two reels each dispensing one sheet.

10. The system of claim 7, wherein the source of radiation comprises an ultraviolet radiation source.

* * * * *